No. 727,903. PATENTED MAY 12, 1903.
G. P. CLARK.
ADJUSTABLE SHAFT CONNECTION.
APPLICATION FILED MAR. 18, 1902.
NO MODEL.
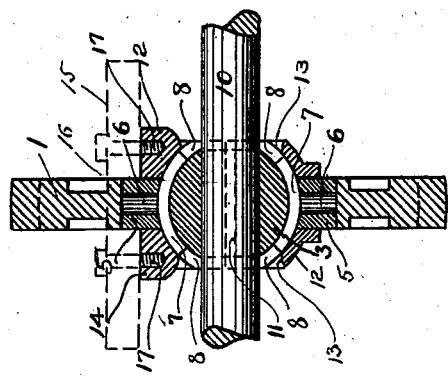
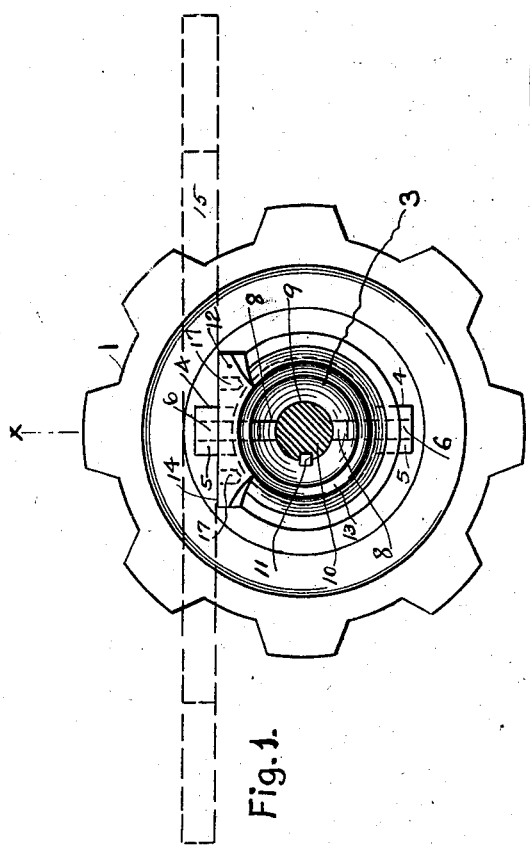
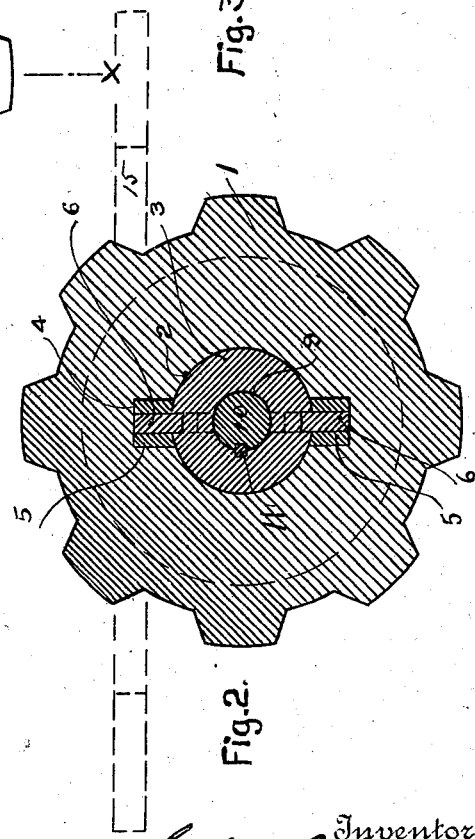
Witnesses
Inventor
George P. Clark
By his Attorney No. 727,903. Patented May 12, 1903.

UNITED STATES PATENT OFFICE.

GEORGE P. CLARK, OF NEW YORK, N. Y., ASSIGNOR OF ONE-HALF TO E. MANN VYNNE, OF NEW YORK, N. Y.

ADJUSTABLE SHAFT CONNECTION.

SPECIFICATION forming part of Letters Patent No. 727,903, dated May 12, 1903.

Application filed March 18, 1902. Serial No. 98,774. (No model.)

*To all whom it may concern:*

Be it known that I, GEORGE P. CLARK, a citizen of the United States, residing at New York, in the county and State of New York, have invented certain new and useful Improvements in Adjustable Shaft Connections, of which the following is a specification.

This invention relates to adjustable shaft connections in engines, and particularly in engines for automobiles and like vehicles, and has for its object to provide a driving-wheel hub which will permit the shaft to be inclined at any angle to the plane of the driving-wheel while the driving-wheel moves steadily in the same plane.

In the drawings, Figure 1 is a side elevation of a driving-wheel embodying my improvements, showing the shaft in section. Fig. 2 is a sectional view through the driving-wheel. Fig. 3 is a transverse sectional view on the line $x\, x$, Fig. 1.

Corresponding parts in all the figures are denoted by the same reference characters.

Referring to the drawings, 1 designates a driving-wheel, herein shown as a sprocket-wheel, such as are usually used in engines for automobiles. The driving-wheel 1 is provided with a central circular aperture 2, having its walls concave and adapted to receive a ball 3. The walls of the aperture 2 are provided at diametrically opposite points with recesses 4, preferably rectangular in cross-section, extending through the driving-wheel 1. Blocks 5, bored longitudinally to receive the round shanks 6 of shoes 7, adapted to slide in grooves 8, formed in the surface of the ball 3, fit in and fill the recesses 4. The ball 3, of suitable material, preferably case-hardened steel, is bored diametrically, as at 9, to receive the shaft 10, which may be secured therein in any suitable manner, as by a key 11. The ball 3 has semicircular grooves 8, preferably rectangular in cross-section, formed in its exterior surface diametrically opposite each other and opening at their ends into the ends of the bore 9, in which grooves the shoes 7 fit. Brackets 12, having their opposed faces flat and ground smooth and provided with central circular apertures 13, the walls of which are formed complementary to the surface of the ball 3, are secured at the sides of the driving-wheel 1. In the form shown the brackets 12 have an upper circular portion, with convex outer walls and a rectangular base 14, which is secured to the engine-frame 15 at the sides of a well 16, in which the lower part of the driving-wheel 1 works. The base 14 may be secured to the frame 15 in any suitable manner, herein shown by bolts 17.

In assembling the parts the shanks 6 of the shoes 7 are inserted in the blocks 5, the ball 3 is placed in the aperture 2 in the driving-wheel 1, with the bore 9 at right angles to the plane of the driving-wheel 1 and with the grooves 8 registering with the recesses 4, and the blocks 5 inserted in the recesses 4, with the shoes 7 in the grooves 8. One of the brackets 12 is now placed at each side of the driving-wheel 1, the ball 3 projecting through the apertures 13 and the flat faces bearing against the blocks 5 and securing them in the recesses 4. The whole is placed on the frame 15, the driving-wheel 1 in the well 16, and bases 14 of the brackets 12 secured to the frame 15 by the bolts 17. The shaft 10 may now be secured in the bore 9 by the key 11 and the device will be in working order.

It is evident from the above organization of parts that while the driving-wheel 1 revolves always in the same plane the ball 3, and consequently the shaft 10, may be turned in any direction on account of the pivotal connection of the shoes 7 with the blocks 5 and the sliding of the shoes 7 in the grooves 8. Hence the angle of the shaft 10 to the plane of the driving-wheel 1 may be changed without interfering with its operation.

The operation and advantages of my invention will be readily understood and appreciated. The parts having been assembled as described, the inequalities in the roads or any other causes which may change the angle of the shaft 10 to the driving-wheel 1 will not affect the engine, since the driving-wheel 1, and consequently the driving-belt, will always remain in proper alinement with the cylinders.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claim.

Having thus described my invention, I claim and desire to secure by Letters Patent—

An adjustable shaft connection, comprising a wheel having a central circular aperture formed with a concave wall, and having diametrically opposite recesses, a ball fitting in said aperture and bored to receive a shaft, blocks fitting said recesses, shoes pivotally secured to said blocks, and means for retaining the blocks and ball in position, comprising brackets adapted to be secured to a suitable support, and having openings to receive the ball, and flat surfaces bearing against the sides of the wheel.

In testimony whereof I have signed my name in the presence of the subscribing witnesses.

GEORGE P. CLARK.

Witnesses:
HARTWELL P. HEATH,
JAS. CLARK PYBAS.